United States Patent
Ogawa et al.

(10) Patent No.: US 11,053,417 B2
(45) Date of Patent: Jul. 6, 2021

(54) CURABLE SILICONE COMPOSITION, CURED PRODUCT THEREOF, AND OPTICAL DISPLAY

(71) Applicant: DOW TORAY CO., LTD., Tokyo (JP)

(72) Inventors: Takuya Ogawa, Ichihara (JP); Haruna Mizuno, Ichihara (JP); Atsushi Sugie, Ichihara (JP); Makoto Yoshitake, Ichihara (JP); Michitaka Suto, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 0 days.

(21) Appl. No.: 16/490,284

(22) PCT Filed: Feb. 28, 2018

(86) PCT No.: PCT/JP2018/007660
§ 371 (c)(1),
(2) Date: Aug. 30, 2019

(87) PCT Pub. No.: WO2018/159725
PCT Pub. Date: Sep. 7, 2018

(65) Prior Publication Data
US 2020/0071580 A1 Mar. 5, 2020

(30) Foreign Application Priority Data

Mar. 2, 2017 (JP) .............................. JP2017-039916
Jun. 19, 2017 (JP) .............................. JP2017-119776
Jun. 19, 2017 (JP) .............................. JP2017-119777

(51) Int. Cl.
| | | |
|---|---|---|
| C08G 77/04 | (2006.01) | |
| C09J 183/12 | (2006.01) | |
| C09J 7/38 | (2018.01) | |
| C08G 77/46 | (2006.01) | |
| G02B 1/04 | (2006.01) | |
| C08G 77/00 | (2006.01) | |
| C08L 83/12 | (2006.01) | |

(52) U.S. Cl.
CPC ............ *C09J 183/12* (2013.01); *C08G 77/46* (2013.01); *C09J 7/38* (2018.01); *G02B 1/04* (2013.01); *C08G 77/70* (2013.01); *C08G 77/80* (2013.01); *C08L 83/12* (2013.01); *C09J 2483/00* (2013.01)

(58) Field of Classification Search
CPC .......... C08L 83/12; C08L 83/06; C08L 83/04; C08K 77/46
USPC .............................................. 528/15, 31, 34
See application file for complete search history.

(56) References Cited

U.S. PATENT DOCUMENTS

| | | | | |
|---|---|---|---|---|
| 5,907,002 A | * | 5/1999 | Kamohara | ............... A61K 6/90 523/109 |
| 8,592,547 B2 | * | 11/2013 | Sakuta | .................. A61K 8/895 528/31 |
| 9,688,869 B2 | * | 6/2017 | Miyamoto | ........... C09D 183/04 |
| 2004/0152858 A1 | * | 8/2004 | Kamohara | ............. C08L 83/04 528/25 |
| 2012/0245305 A1 | | 9/2012 | Souda et al. | |

FOREIGN PATENT DOCUMENTS

| | | |
|---|---|---|
| CN | 106118584 A | 11/2016 |
| EP | 2165693 A2 | 3/2010 |
| EP | 3524655 A1 | 8/2019 |
| JP | 2001336071 A | 12/2001 |
| JP | 2002348379 A | 12/2002 |
| JP | 2003119389 A | 4/2003 |
| JP | 2003128517 A | 5/2003 |
| JP | 2003292415 A | 10/2003 |
| JP | 2010260961 A | 11/2010 |
| JP | 2011116902 A | 6/2011 |
| JP | 2012111850 A | 6/2012 |
| JP | 2012122021 A | 6/2012 |
| JP | 2016204596 A | 12/2016 |

OTHER PUBLICATIONS

English translation of International Search Report for PCT/JP2018/007660 dated May 29, 2018, 2 pages.
Machine assisted English translation of JP2001336071A obtained from https://patents.google.com/ on Nov. 22, 2018, 10 pages.
Machine assisted English translation of JP2002348379A obtained from https://patents.google.com/ on Nov. 22, 2018, 10 pages.
Machine assisted English translation of JP2003119389A obtained from https://patents.google.com/ on Nov. 22, 2018, 9 pages.
Machine assisted English translation of JP2003128517A obtained from https://patents.google.com/ on Nov. 22, 2018, 9 pages.
Machine assisted English translation of JP2010260961A obtained from https://patents.google.com/ on Nov. 22, 2018, 14 pages.
Machine assisted English translation of JP2012111850A obtained from https://patents.google.com/ on Nov. 26, 2018, 17 pages.

(Continued)

*Primary Examiner* — Margaret G Moore
(74) *Attorney, Agent, or Firm* — Warner Norcross + Judd LLP

(57) ABSTRACT

Disclosed is a curable silicone composition. The composition comprises: (A) an organopolysiloxane having at least two alkenyl groups and at least one aryl group in each molecule; (B) a polyoxyalkylene compound represented by the general formula: $XO-(C_2H_4O)_p(C_nH_{2n}O)_q(YO)_r-X$, wherein, each X represents a hydrogen atom, an alkyl group, an alkenyl group, an aryl group, an acryl group, or a methacryl group, provided that at least one X in each molecule is the alkenyl group, the acryl group, or the methacryl group, Y represents a divalent hydrocarbon group, n represents an integer of 3 to 6, p and q are integers satisfying: $2 \le p \le 100$ and $0 \le q \le 50$, and r represents 0 or 1; (C) an organopolysiloxane having at least two silicon bonded hydrogen atoms in each molecule; and (D) a catalyst for a hydrosilylation reaction. The composition forms a cured product having improved properties.

12 Claims, No Drawings

(56) References Cited

OTHER PUBLICATIONS

Machine assisted English translation of JP2012122021A obtained from https://patents.google.com/ on Nov. 26, 2018, 15 pages.
Machine assisted English translation of JP2016204596A obtained from https://patents.google.com/ on Nov. 26, 2018, 19 pages.
Machine assisted English translation of JP2003292415A obtained from https://patents.google.com/patent on Mar. 26, 2021, 17 pages.
Machine assisted English translation of CN106118584A obtained from https://patents.google.com/patent on Mar. 26, 2021, 11 pages.

\* cited by examiner

CURABLE SILICONE COMPOSITION, CURED PRODUCT THEREOF, AND OPTICAL DISPLAY

CROSS-REFERENCE TO RELATED APPLICATIONS

This application is the National Stage of International Application No. PCT/JP2018/007660 filed on 28 Feb. 2018, which claims priority to and all advantages of Japanese Patent Application No. 2017-039916 filed on 2 Mar. 2017, Japanese Patent Application No. 2017-119776 filed on 19 Jun. 2017, and Japanese Patent Application No. 2017-119777 filed on 19 Jun. 2017, the contents of which are hereby incorporated by reference.

TECHNICAL FIELD

The present invention relates to a curable silicone composition, a cured product thereof, and an optical display obtained using the composition.

BACKGROUND ART

As adhesives and pressure sensitive adhesives for enhancing visibility of an optical display, curable silicone compositions having high transparency are used, wherein cured products obtained by curing have high elongation. Because the optical display comprises thermally unstable materials as display parts such as liquid crystal and organic electroluminescence, as well as display forming members such as a touch panel and cover lens, these curable silicone compositions are preferably cured at relatively low temperatures, specifically 40° C. or lower, with ultraviolet curable silicone compositions having been applied thus far.

However, there is a demand for a low temperature curable silicone composition which does not require ultraviolet radiation because decorative portions for decoration are often provided in the display periphery and ultraviolet light is not transmitted. For example, Patent Document 1 proposes a curable silicone composition comprising: an organopolysiloxane having alkenyl groups and aryl groups; an organopolysiloxane having silicon atom-bonded hydrogen atoms; a compound having polyalkylene oxide chains; and a platinum base catalyst.

Unfortunately, with such a curable silicone composition, the cured product obtained problematically becomes cloudy or discolored if exposed to a state of high temperatures and high humidity for extended periods of time.

PRIOR ART DOCUMENTS

Patent Documents

[Patent Document 1] JP 2012-111850 A

SUMMARY OF THE INVENTION

Problems to be Solved by the Invention

An object of the present invention is to provide a curable silicone composition which has excellent curability at relatively low temperatures, and forms a cured product maintaining transparency with little clouding and discoloration even if exposed to high temperatures and high humidity. Moreover, another object of the present invention is to provide a cured product which maintains transparency and has little clouding and discoloration even if exposed to high temperatures and high humidity. Furthermore, another object of the present invention is to provide an optical display having excellent reliability.

Means for Solving the Problems

A curable silicone composition of the present invention comprises:
(A) an organopolysiloxane that has at least two alkenyl groups with 2 to 12 carbon atoms and at least one aryl group with 6 to 20 carbon atoms in each molecule;
(B) a polyoxyalkylene compound represented by the general formula:

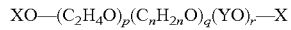

wherein, each X represents the same or different hydrogen atom, alkyl group with 1 to 12 carbon atoms, alkenyl group with 1 to 12 carbon atoms, aryl group with 6 to 20 carbon atoms, acryl group, or methacryl group, provided that at least one X in each molecule is the alkenyl group, the acryl group, or the methacryl group, Y represents a divalent hydrocarbon group with 2 to 20 carbon atoms, n represents an integer of 3 to 6, p and q are integers satisfying: $2 \leq p \leq 100$ and $0 \leq q \leq 50$, and r represents 0 or 1;
(C) an organopolysiloxane having at least two silicon bonded hydrogen atoms in each molecule; and
(D) a catalyst for a hydrosilylation reaction,
wherein the content of component (B) is an amount such that the total amount of units represented by the formula: $C_2H_4O$ in component (B) is 0.4 to 40 mass % with respect to the total amount of components (A) to (D),
wherein the content of component (C) is an amount such that the silicon bonded hydrogen atoms in component (C) are 0.1 to 5 mol per 1 mol of the total aliphatic unsaturated carbon-carbon bonds in components (A) and (B), and
wherein the content of component (D) is a sufficient amount to promote curing of the present composition.

In the present composition, the viscosity at 25° C. of component (A) is preferably 50 to 100,000 mPa·s, while the content of aryl groups with respect to all silicon atom bonded organic groups in component (A) is preferably at least 30 mol %.

In the present composition, the viscosity at 25° C. of component (C) is preferably 1 to 10,000 mPa·s.

Furthermore, in order to reduce the viscosity of the present composition, it preferably comprises: (E) a diorganosiloxane oligomer having at least one aryl group with 6 to 20 carbon atoms and not having a hydrosilylation reactive functional group in each molecule, in an amount of 1 to 50 parts by mass with respect to 100 parts by mass of the total of components (A) to (D). The viscosity at 25° C. of component (E) is preferably 1 to 500 mPa·s.

Such component (E) is preferably a diorganosiloxane oligomer represented by the general formula:

[Formula 1]

wherein, each R is the same or different monovalent hydrocarbon group with 1 to 12 carbon atoms not having an aliphatic unsaturated bond, provided that at least one R in each molecule is an aryl group with 6 to 20 carbon atoms, while x is an integer of 3 to 10, and is preferably a diorganosiloxane oligomer having an aryl group of 5 to 60 mol % of all Rs in each molecule.

The present composition is suitable as an optical adhesive or pressure sensitive adhesive.

The cured product of the present invention is obtained by curing the curable silicone composition described above.

A laminate of the present invention contains: the cured product described above along with an optical member.

An optical display of the present invention is obtained using the curable silicone composition described above.

Effects of the Invention

Furthermore, the curable silicone composition of the present invention has good curability even at relatively low temperatures and the cured product obtained maintains transparency and tends not to cause clouding and discoloration even if exposed to high temperatures and high humidity. Furthermore, the cured product of the present invention maintains transparency and tends not to cause clouding and discoloration even if exposed to high temperatures and high humidity. Furthermore, the optical display of the present invention has excellent reliability.

MODE FOR CARRYING OUT THE INVENTION

The curable silicone composition of the present invention is described below in detail.

Component (A) is an organopolysiloxane that has at least two alkenyl groups with 2 to 12 carbon atoms and at least one aryl group with 6 to 20 carbon atoms in each molecule. Examples of the alkenyl groups in component (A) include vinyl groups, allyl groups, butenyl groups, pentenyl groups, hexenyl groups, heptenyl groups, octenyl groups, nonenyl groups, decenyl groups, undecenyl groups, and dodecenyl groups; however, from the perspective of economic efficiency and reactivity, vinyl groups, allyl groups, hexenyl groups, and octenyl groups are preferable. Moreover, examples of the aryl groups in component (A) include phenyl groups, tolyl groups, and xylyl groups, with phenyl groups being preferable from the perspective of economic efficiency. The content of the aryl groups in component (A) is not limited, but the content of aryl groups with respect to all of the silicon atom bonded organic groups in component (A) is preferably 30 mol % or more, 35 mol % or more, 40 mol % or more, or 45 mol % or more because the obtained cured product has excellent transparency and tends not to cause clouding if exposed to high temperatures and high humidity, while the content of the aryl groups with respect to all of the organic groups bonded to the silicon atoms in component (A) is preferably 60 mol % or less, 50 mol % or less, or less than 50 mol % because the obtained cured product has good weatherability. Such component (A) preferably has a refractive index ($_nD$) at 25° C. of 1.43 or more, 1.48 or more, or 1.50 or more.

Furthermore, examples of groups that are bonded to the silicon atoms in component (A) include: alkyl groups with 1 to 12 carbon atoms such as methyl groups, ethyl groups, propyl groups, butyl groups, pentyl groups, hexyl groups, heptyl groups, octyl groups, nonyl groups, decyl groups, undecyl groups, and dodecyl groups; aralkyl groups with 7 to 12 carbon atoms such as benzyl groups and phenetyl groups; halogen substituted alkyl groups with 1 to 12 carbon atoms such as 3-chloropropyl groups and 3,3,3-trifluoropropyl groups; but from the perspective of economic efficiency and heat resistance, methyl groups are preferable. Furthermore, the silicon atoms in component (A) may be bonded to a small amount of hydroxyl groups or alkoxy groups such as methoxy groups, ethoxy groups, n-propoxy groups, i-propoxy groups, n-butoxy groups, sec-butoxy groups, and tert-butoxy groups as long as they do not impair the object of the present invention.

While the molecular structure of component (A) is not particularly limited, examples thereof include a linear structure, partially branched linear structure, branched structure, cyclic structure, and three-dimensional network structure. Component (A) may be a single organopolysiloxane having these molecular structures or a mixture of two or more organopolysiloxanes having these molecular structures.

Examples of such component (A) include: methylphenylpolysiloxanes blocked with dimethylvinylsiloxy groups at both molecular chain terminals; diphenylpolysiloxanes blocked with dimethylvinylsiloxy groups at both molecular chain terminals; copolymers of dimethylsiloxane and methylphenylsiloxane blocked with dimethylvinylsiloxy groups at both molecular chain terminals; copolymers of dimethylsiloxane and diphenylsiloxane blocked with dimethylvinylsiloxy groups at both molecular chain terminals; dimethylpolysiloxanes blocked with methylphenylvinylsiloxy groups at both molecular chain terminals; copolymers of dimethylsiloxane and methylphenylsiloxane blocked with methylphenylvinylsiloxy groups at both molecular chain terminals; copolymers of dimethylsiloxane, methylphenylsiloxane and diphenylsiloxane blocked with dimethylvinylsiloxy groups at both molecular chain terminals; and copolymers of methylvinylsiloxane, dimethylsiloxane and methylphenylsiloxane blocked with trimethylsiloxy groups at both molecular chain terminals. Methylphenyl polysiloxanes blocked with dimethylvinylsiloxy groups at both molecular chain terminals, copolymers of dimethylsiloxane and methylphenylsiloxane blocked with dimethylvinylsiloxy groups at both molecular chain terminals, or copolymers of dimethylsiloxane and diphenylsiloxane blocked with dimethylvinylsiloxy groups at both molecular chain terminals are preferable. Due to their excellent curability and ease of suppressing the mixing of crystalline byproducts upon production, methylphenylpolysiloxanes blocked with dimethylvinylsiloxy groups at both molecular chain terminals or copolymers of dimethylsiloxane and diphenylsiloxane blocked with dimethylvinylsiloxy groups at both molecular chain terminals are particularly preferable.

Moreover, while the viscosity at 25° C. of component (A) is not limited, it is preferably within a range of 50 to 100,000 mPa·s, within a range of 100 to 100,000 mPa·s, within a range of 100 to 50,000 mPa·s, or within a range of 100 to 10,000 mPa·s. This is because, if the viscosity of component (A) is above the lower limit of the aforementioned range, the mechanical properties of the cured product obtained will be enhanced; in contrast, if the viscosity is below the upper limit of the aforementioned range, the handleability of the composition obtained will be enhanced.

Component (B) is a polyoxyalkylene compound represented by the general formula:

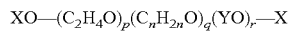

$$XO-(C_2H_4O)_p(C_nH_{2n}O)_q(YO)_r-X$$

which is a component, wherein a cured product obtained by curing the present composition maintains transparency and tends not to cause clouding and discoloration even if exposed to high temperatures and high humidity.

In the above formula, each X is the same or different hydrogen atom, alkyl group having 1 to 12 carbon atoms, alkenyl group having 2 to 12 carbon atoms, aryl group having 6 to 20 carbon atoms, acryl group, or methacryl group. Examples of the alkyl groups for X include methyl groups, ethyl groups, propyl groups, butyl groups, pentyl groups, hexyl groups, heptyl groups, octyl groups, nonyl groups, decyl groups, undecyl groups, and dodecyl groups. Examples of the alkenyl groups for X include vinyl groups, allyl groups, 2-methyl-2-propen-1-yl groups (so-called methallyl groups), 3-buten-1-yl groups, 3-methyl-3-buten-1-yl groups, 4-buten-1-yl groups, 5-penten-1-yl groups, 4-vinylphenyl groups, and 4-(1-methylvinyl)phenyl groups. Examples of the aryl groups for X include phenyl groups, o-methylphenyl groups, p-methylphenyl groups, o-phenylphenyl groups (so-called o-biphenyl groups), p-phenylphenyl groups (so-called p-biphenyl groups), and p-nonylphenyl groups. Note that at least one X in each molecule is from the abovementioned alkenyl groups, acryl groups, or methacryl groups, preferably the abovementioned alkenyl groups, further preferably metallyl groups. Moreover, all Xs in each molecule are from the abovementioned alkenyl groups, acryl groups, or methacryl groups, preferably the abovementioned alkenyl groups, further preferably metallyl groups.

Moreover, in the above formula, Y is a divalent hydrocarbon group having 2 to 20 carbon atoms, with specific examples thereof including ethylene groups, propylene groups, butylene groups, pentylene groups, neopentylene groups, hexylene groups, 1,4-phenylene groups, 2-methyl-1,4-phenylene groups, 2-phenyl-1,4-phenylene groups, and 4,4'-(propan-2,2-diyl)diphenyl groups.

Moreover, in the above formula, n is an integer of 3 to 6, preferably 3.

Furthermore, in the above formula, p is an integer satisfying: $2 \leq p \leq 100$, preferably an integer satisfying: $2 \leq p \leq 75$ or $2 \leq p \leq 50$. In contrast, q is an integer satisfying: $0 \leq q \leq 50$, preferably an integer satisfying: $0 \leq q \leq 30$ or $2 \leq q \leq 30$.

Moreover, in the above formula, r is an integer of 0 or 1, preferably 0.

Such component (B) is a polyoxyalkylene compound comprising one type or a mixture of two or more types represented by the above general formula. In the general formula of component (B), units represented by the formula: $C_2H_4O$, units represented by the formula: $C_nH_{2n}O$, and units represented by the formula: YO may each be randomly connected or may each be connected in a block shape. While the molecular weight of such component (B) is not limited, the weight average molecular weight as measured by the gel permeation chromatography method is preferably within a range of 200 to 10,000, or within a range of 200 to 5,000. This is because, if the weight average molecular weight of component (B) is above the lower limit of the aforementioned range, the dynamic physical properties of the cured product obtained will be good; however, on the other hand, if below the upper limit of the aforementioned range, the moldability, coatability, and transparency of the composition obtained will be enhanced.

Examples of such component (B) include polyoxyalkylene compounds such as those described below. Note that in the formulae, Me represents a methyl group, $X^1$, $X^2$, $X^3$, and $X^4$ represent a methyl group, allyl group, methallyl group, and acryl group, respectively, p is an integer of 2 to 100, and q is an integer of 1 to 50. Note that any unit may be randomly connected or may be connected by blocks.

$X^2O(C_2H_4O)_p[CH_2CH(Me)O]_qX^2$ $X^3O(C_2H_4O)_p[CH_2CH(Me)O]_qX^3$ $X^4O(C_2H_4O)_p[CH_2CH(Me)O]_qX^4$ $X^2O(C_2H_4O)_p[CH_2CH(Me)O]_qX^1$ $X^3O(C_2H_4O)_p[CH_2CH(Me)O]_qX^1$ $X^4O(C_2H_4O)_p[CH_2CH(Me)O]_qX^1$ $X^2O(C_2H_4O)_pX^2$ $X^3O(C_2H_4O)_pX^3$ $X^4O(C_2H_4O)_pX^4$ $X^2O(C_2H_4O)_pX^1$ $X^3O(C_2H_4O)_pX^1$ $X^4O(C_2H_4O)_pX^1$ $X^2O(C_2H_4O)_p\text{-para-}C_6H_4\text{—}C_9H_{19}$ $X^3O(C_2H_4O)_p\text{-para-}C_6H_4\text{—}C_9H_{19}$ $X^4O(C_2H_4O)_p\text{-para-}C_6H_4\text{—}C_9H_{19}$ $X^2O(C_2H_4O)_p\text{—}C_6H_5$ $X^3O(C_2H_4O)_p\text{—}C_6H_5$ $X^4O(C_2H_4O)_p\text{—}C_6H_5$ $X^2O(C_2H_4O)_p\text{-para-}C_6H_4\text{—}CMe_2\text{-para-}C_6H_4\text{—}O(C_2H_4O)_pX^2$ $X^3O(C_2H_4O)_p\text{-para-}C_6H_4\text{—}CMe_2\text{-para-}C_6H_4\text{—}O(C_2H_4O)_pX^3$ $X^4O(C_2H_4O)_p\text{-para-}C_6H_4\text{—}CMe_2\text{-para-}C_6H_4\text{—}O(C_2H_4O)_pX^4$ The content of component (B) is an amount such that the total amount of units represented by the formula: $C_2H_4O$ in component (B) is within a range of 0.4 to 40 mass % with respect to the total amount of components (A) to (D), and is preferably an amount such that the lower limit thereof is 1 mass % or more, 2 mass % or more, 3 mass % or more, 3.5 mass % or more, or 4 mass % or more, while the upper limit thereof is 30 mass % or less, 20 mass % or less, 10 mass % or less, 5 mass % or less, 4.5 mass % or less, or less than 4.5 mass %. Note that the content of component (B) can be any range obtained by combining the abovementioned lower limits and upper limits. This is because, if the content of component (B) is above the lower limit of the aforementioned range, the curability of the composition obtained will be good and the transparency of the obtained cured product at high temperatures and high humidity will be good; however, if, on the other hand, the content is below the upper limit of the aforementioned range, the adhesiveness of the cured product obtained will be good.

Furthermore, the content of component (B) is an amount within a range of 0.5 to 50 mass % with respect to the total amount of components (A) to (D), and is preferably an amount such that the lower limit thereof is 1 mass % or more, 2 mass % or more, 3 mass % or more, more than 3 mass %, 3.5 mass % or more, or 4 mass % or more, while the upper limit thereof is 40 mass % or less, 30 mass % or less, 20 mass % or less, 10 mass % or less, 9 mass % or less, or 5 mass % or less. Note that the content of component (B) can be any range obtained by combining the abovementioned lower limits and upper limits. This is because, if the content of component (B) is above the lower limit of the aforementioned range, as described above, the curability of the composition obtained will be good and the transparency of the obtained cured product at high temperatures and high humidity will be good; however, if, on the other hand, the content is below the upper limit of the aforementioned range, the adhesiveness of the cured product obtained will be good.

Component (C) is an organopolysiloxane having at least two silicon bonded hydrogen atoms in each molecule. Examples of groups bonded to silicon atoms other than silicon bonded hydrogen atoms in component (C) include: alkyl groups with 1 to 12 carbon atoms such as methyl groups, ethyl groups, propyl groups, butyl groups, pentyl groups, hexyl groups, heptyl groups, octyl groups, nonyl groups, decyl groups, undecyl groups, and dodecyl groups; aryl groups with 6 to 20 carbon atoms such as phenyl groups, tolyl groups, and xylyl groups; aralkyl groups with 7 to 20 carbon atoms such as benzyl groups and phenetyl groups; and halogen substituted alkyl groups with 1 to 12 carbon atoms such as 3-chloropropyl groups and 3,3,3-trifluoropropyl groups; but from the perspective of economic efficiency and heat resistance, methyl groups and phenyl groups are preferable. Furthermore, the silicon atoms in component (B) may be bonded to a small amount of hydroxyl groups or alkoxy groups such as methoxy groups, ethoxy groups, n-propoxy groups, i-propoxy groups, n-butoxy groups, sec-butoxy groups, and tert-butoxy groups. Note that, because component (C) has excellent affinity with component (A), an organopolysiloxane having at least one aryl group in each molecule is preferable.

While the viscosity at 25° C. of component (C) is not limited, it is preferably within a range of 1 to 10,000 mPa·s, within a range of 1 to 1,000 mPa·s, or within a range of 1 to 500 mPa·s. This is because, if the viscosity of component (C) is above the lower limit of the aforementioned range, the mechanical properties of the cured product obtained will be enhanced; however, if, on the other hand, the viscosity is below the upper limit of the aforementioned range, the transparency and handleability of the composition obtained will be enhanced.

While the molecular structure of component (C) is not particularly limited, examples thereof include a linear structure, partially branched linear structure, branched structure, cyclic structure, and three-dimensional network structure. Component (C) may be a single organopolysiloxane having these molecular structures or a mixture of two or more organopolysiloxanes having these molecular structures.

Exemplary such components (C) may include, for example, ($C_1$) a linear organopolysiloxane represented by the general formula:

$$R^1{}_3Si(R^1{}_2SiO)_m SiR^1{}_3$$

and/or ($C_2$) a branched organopolysiloxane represented by the average unit formula:

$$(R^1{}_3SiO_{1/2})_a(R^1{}_2SiO_{2/2})_b(R^2SiO_{3/2})_c(SiO_{4/2})_d.$$

In component ($C_1$), in the formula, each $R^1$ is the same or different hydrogen atom, alkyl group having 1 to 12 carbon atoms, aryl group having 6 to 20 carbon atoms, aralkyl group having 7 to 20 carbon atoms, or halogen substituted alkyl group having 1 to 12 carbon atoms. Examples of the alkyl groups for $R^1$ include methyl groups, ethyl groups, propyl groups, butyl groups, pentyl groups, hexyl groups, heptyl groups, octyl groups, nonyl groups, decyl groups, undecyl groups, and dodecyl groups. Moreover, examples of the aryl groups for $R^1$ include phenyl groups, tolyl groups, and xylyl groups. Moreover, examples of the aralkyl groups for $R^1$ include benzyl groups and phenethyl groups. Moreover, examples of the halogen substituted alkyl groups for $R^1$ include 3-chloropropyl groups and 3,3,3-trifluoropropyl groups. Note that at least two $R^1$s per one molecule are hydrogen atoms.

Furthermore, in component ($C_1$), in the formula, m represents an integer of 1 or more, and preferably an integer in which the viscosity of component ($C_1$) at 25° C. is within a range of 1 to 10,000 mPa·s, within a range of 1 to 1,000 mPa·s, or within a range of 1 to 500 mPa·s.

Such component ($C_1$) can be one organopolysiloxane or a mixture of two or more organopolysiloxanes represented by the following general formulae. Note that in the formulae, Me and Ph represent methyl groups and phenyl groups, respectively, m' and m'' represent integers that are 1 or higher such that the viscosity at 25° C. is within a range of 1 to 10,000 mPa s, and m''' is an integer of 2 or higher such that the viscosity at 25° C. is within a range of 1 to 10,000 mPa s.

$$Me_3SiO(Me_2SiO)_{m'}(MeHSiO)_{m'''}SiMe_3$$

$$Me_3SiO(MePhSiO)_{m'}(MeHSiO)_{m'''}SiMe_3$$

$$Me_3SiO(Ph_2SiO)_{m'}(MeHSiO)_{m'''}SiMe_3$$

$$Me_3SiO(Me_2SiO)_{m'}(Ph_2SiO)_{m''}(MeHSiO)_{m'''}SiMe_3$$

$$HMe_2SiO(Me_2SiO)_{m'}SiMe_2H$$

$$HMe_2SiO(Ph_2SiO)_{m'}SiMe_2H$$

$$HMe_2SiO(Me_2SiO)_{m'}(Ph_2SiO)_{m''}SiMe_2H$$

In component ($C_2$), in the formula, each $R^1$ is the same or different hydrogen atom, alkyl group having 1 to 12 carbon atoms, aryl group having 6 to 20 carbon atoms, aralkyl group having 7 to 20 carbon atoms, or halogen substituted alkyl group having 1 to 12 carbon atoms, with examples thereof including the same groups as those described above. Note that at least two $R^1$s per one molecule are hydrogen atoms.

Moreover, in component ($C_2$), in the formula, $R^2$ is an alkyl group having 1 to 12 carbon atoms, an aryl group having 6 to 20 carbon atoms, an aralkyl group having 7 to 20 carbon atoms, or a halogen substituted alkyl group having 1 to 12 carbon atoms, with examples thereof including the same groups as $R^1$ described above.

Furthermore, in component ($C_2$), in the formula, a, b, c, and d are numbers from 0 to 1, respectively, and the total of a, b, c, and d are 1. Note that b, c, and d are not 0 at the same time.

Such component ($C_2$) can be one organopolysiloxane or a mixture of two or more organopolysiloxanes represented by the following average unit formulae. Note that in the formulae, Me and Ph represent methyl groups and phenyl groups, respectively; a', a'', b', c', and d' represent numbers of 1 or lower (however 0 is not included), and the total of a', a'', b', c', and d' is 1.

$$(Me_3SiO_{1/2})_{a'}(Me_2HSiO_{1/2})_{a''}(Me_2SiO_{2/2})_{b'}(MeSiO_{3/2})_{c'}$$

$$(Me_3SiO_{1/2})_{a'}(Me_2HSiO_{1/2})_{a''}(MeSiO_{3/2})_{c'}$$

$$(Me_3SiO_{1/2})_{a'}(Me_2HSiO_{1/2})_{a''}(SiO_{4/2})_{d'}$$

$$(Me_2HSiO_{1/2})_{a''}(MeSiO_{3/2})_{c'}$$

$$(Me_2HSiO_{1/2})_{a''}(SiO_{4/2})_{d'}$$

$$(Me_3SiO_{1/2})_{a'}(Me_2HSiO_{1/2})_{a''}(MePhSiO_{2/2})_{b'}(PhSiO_{3/2})_{c'}$$

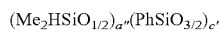

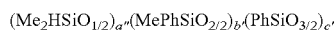

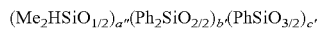

In component (C), the abovementioned component ($C_1$) or ($C_2$) can be used alone or in combination. The combined use of components ($C_1$) and ($C_2$) can improve the mechanical properties of the obtained cured product. In the combined use of components ($C_1$) and ($C_2$), the mass ratio of components ($C_1$) and ($C_2$) is preferably within a range of 10:90 to 90:10, within a range of 30:70 to 90:10, or within a range of 50:50 to 90:10.

The content of component (C) is an amount such that the silicon atom bonded hydrogen atoms in component (C) are 0.1 to 5 mol per 1 mol of the total aliphatic unsaturated carbon-carbon bonds in components (A) and (B), preferably at least 0.2 mol, at least 0.4 mol, or at least 0.5 mol, or at most 3 mol, at most 2 mol, or at most 1.5 mol, at any amount within the range of these lower limits and upper limits. This is because, if the content of component (C) is above the lower limit of the aforementioned range, the composition obtained will sufficiently cure; however, if, on the other hand, the content is below the upper limit of the aforementioned range, the mechanical properties of the cured product obtained will be enhanced.

Component (D) is a hydrosilylation reaction catalyst for promoting curing of the present composition. Examples thereof include platinum base catalysts, rhodium base catalysts, and palladium base catalysts, with platinum base catalysts being preferable. Examples of the platinum base catalyst include platinum fine powder, platinum black, platinum supporting silica fine powder, platinum supporting activated carbon, chloroplatinic acid, alcohol solutions of chloroplatinic acid, olefin complexes of platinum, and alkenylsiloxane complexes of platinum.

The content of component (D) is an amount that promotes curing of the present composition and is specifically an amount in which platinum atoms in the catalyst are within a range of 0.1 to 1,000 ppm in mass units with regard to the present composition. This is because, if the content of component (D) is above the lower limit of the aforementioned range, curing of the composition obtained sufficiently progresses; however, on the other hand, if the content is at the upper limit or lower of the aforementioned range, discoloration of the cured product obtained is less likely to occur.

Moreover, the present composition comprises the abovementioned components (A) to (D), but may also comprise (E) a diorganosiloxane oligomer having at least one aryl group having 6 to 20 carbon atoms in each molecule in order to reduce the viscosity of the present composition without influencing the properties thereof even if the composition remains in the cured product of the present composition. Examples of the aryl groups in component (E) include phenyl groups, tolyl groups, and xylyl groups. Furthermore, component (E) does not have a hydrosilylation reactive functional group in the molecule. As the hydrosilylation reactive functional groups, alkenyl groups and silicon atom bonded hydrogen atoms are exemplified. Examples of groups bonded to silicon atom other than the aryl groups in component (E) include: alkyl groups with 1 to 12 carbon atoms such as methyl groups, ethyl groups, propyl groups, butyl groups, pentyl groups, hexyl groups, heptyl groups, octyl groups, nonyl groups, decyl groups, undecyl groups, and dodecyl groups; aralkyl groups with 7 to 20 carbon atoms such as benzyl groups and phenetyl groups; and halogen substituted alkyl groups with 1 to 12 carbon atoms such as 3-chloropropyl groups and 3,3,3-trifluoropropyl groups; but from the perspective of economic efficiency and heat resistance, methyl groups are preferable.

While the viscosity at 25° C. of component (E) is not limited, it is preferably within a range of 1 to 500 mPa·s, within a range of 1 to 300 mPa·s, or within a range of 1 to 200 mPa·s. This is because, if the viscosity of component (E) is above the lower limit of the aforementioned range, the mechanical properties of the cured product obtained will not be changed; in contrast, if the viscosity is below the upper limit of the aforementioned range, the viscosity of the composition obtained will be able to be sufficiently reduced.

While the molecular structure of such component (E) is not particularly limited, examples thereof include a linear structure, partially branched linear structure, branched structure, cyclic structure, and three-dimensional network structure. Due to good affinity with the cured product obtained by curing the present composition along with great viscosity reducing effects, the cyclic structure is preferable. Such component (E) is represented by the general formula:

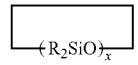

[Formula 2]

In the formula, each R is the same or different monovalent hydrocarbon group with 1 to 12 carbon atoms and free from an aliphatic unsaturated bond, with examples thereof including alkyl groups, aryl groups, aralkyl groups, and halogen substituted alkyl groups. Note that at least one R is an aryl group having 6 to 20 carbon atoms in each molecule, while 5 to 60 mol % of all Rs are particularly preferably the abovementioned aryl groups. In the formula, x is an integer of 3 to 10.

The content of component (E) is an amount within a range of 1 to 50 parts by mass with respect to 100 parts by mass of the total of components (A) to (D), and is preferably an amount such that the lower limit thereof is 2 parts by mass, 3 parts by mass, 4 parts by mass, or 5 parts by mass, while the upper limit thereof is 40 parts by mass, 35 parts by mass, or 30 parts by mass, and is within any range of these lower limits and upper limits.

Furthermore, the present composition preferably contains an adhesion promoter in order to further improve adhesiveness and adhesion onto a contacting substrate during curing. A publicly known substance which can be added to the curable silicone composition cured by a hydrosilylation reaction can be used as this adhesion promoter.

Examples of such adhesion promoters include: an organosilane or an organosiloxane oligomer having a linear structure, branched structure, or cyclic structure with approximately 4 to 20 silicon atoms, which has a trialkoxysiloxy group (e.g., a trimethoxysiloxy group, a triethoxysiloxy group) or a trialkoxysilylalkyl group (e.g., a trimethoxysilylethyl group, a triethoxysilylethyl group) and a hydrosilyl group or an alkenyl group (e.g., a vinyl group, an allyl group); an organosilane or an organosiloxane oligomer having a linear structure, branched structure, or cyclic structure with approximately 4 to 20 silicon atoms, which has a trialkoxysiloxy group or a trialkoxysilylalkyl group and a methacryloxyalkyl group (e.g., a 3-methacryloxypropyl group); an organosilane or an organosiloxane oligomer having a linear structure, branched structure, or cyclic structure with approximately 4 to 20 silicon atoms, which has a trialkoxysiloxy group or a trialkoxysilylalkyl group and an epoxy group-bonded alkyl group (e.g., a 3-glycidoxypropyl group, a 4-glycidoxybutyl group, a 2-(3,4-epoxycyclohexyl)ethyl group, a 3-(3,4-epoxycyclohexyl)propyl group); an alkane compound having multiple alkoxysilyl groups such as 1,6-bis(trimethoxysilyl)hexane, 1,6-bis(methyldimethoxysilyl)hexane, 1,8-bis(trimethoxysilyl)octane, and 1,8-bis(methyldimethoxysilyl)octane; a reactant of aminoalkyltrialkoxysilane and epoxy group-bonded alkyltrialkoxysilane; an epoxy group-containing ethyl polysilicate; an epoxy group-containing organopolysiloxane having a branched structure; and an amino group-containing organopolysiloxane having a branched structure. Specific examples thereof include vinyl trimethoxysilane, allyl trimethoxysilane, allyl triethoxysilane, hydrogen triethoxysilane, 3-glycidoxypropyl trimethoxysilane, 3-glycidoxypropyl triethoxysilane, 2-(3,4-epoxycyclohexyl)ethyl trimethoxysilane, 3-methacryloxypropyl trimethoxysilane, 3-methacryloxypropyl triethoxysilane, a reactant of 3-glycidoxypropyl triethoxysilane and 3-aminopropyl triethoxysilane, a condensation reactant of a methylvinyl siloxane oligomer blocked with silanol groups and a 3-glycidoxypropyl trimethoxysilane, a condensation reactant of a methylvinyl siloxane oligomer blocked with silanol groups and a 3-methacryloxypropyl triethoxysilane, tris(3-trimethoxysilylpropyl)isocyanurate, and an organopolysiloxane containing an epoxy group and an alkenyl group, represented by the average composition formula:

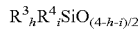

$$R^3_h R^4_i SiO_{(4-h-i)/2}$$

wherein, $R^3$ is an epoxy group-containing organic group, $R^4$ is an alkyl group having 1 to 12 carbon atoms, an aryl group having 6 to 20 carbon atoms, an alkenyl group having 2 to 12 carbon atoms, an aralkyl group having 7 to 20 carbon atoms, or a halogen substituted alkyl group having 1 to 12 carbon atoms, 1 mol % or more of all $R^4$s is the alkenyl group, h is 0.05 to 1.8, and i is 0.1 to 1.8.

In the organopolysiloxane containing an epoxy group and an alkenyl group, in the formula, $R^3$ is an epoxy group-containing organic group, with examples thereof including an epoxy group-containing alkyl group such as a 3-glycidoxypropyl group and 2-(3,4-epoxycyclohexyl)ethyl group. Moreover, $R^4$ is an alkyl group having 1 to 12 carbon atoms, an aryl group having 6 to 20 carbon atoms, an alkenyl group having 2 to 12 carbon atoms, an aralkyl group having 7 to 20 carbon atoms, or a halogen substituted alkyl group having 1 to 12 carbon atoms, with examples thereof including the same groups as described above. Note that 1 mol % or more of all $R^4$s are alkenyl groups, with 3 mol % or more being preferably alkenyl groups. Moreover, from the perspective of compatibility with the present composition, at least 10 mol % of all $R^4$s are more preferably phenyl groups. h is 0.05 to 1.8, preferably 0.05 to 0.7, more preferably 0.1 to 0.6. i is 0.1 to 1.8, preferably 0.2 to 1.8. Such an organopolysiloxane containing an epoxy group and an alkenyl group can be easily obtained via the cohydrolysis of an epoxy group-containing alkoxysilane and an alkenyl group-containing alkoxysilane. Note that the epoxy group-containing organopolysiloxane may contain a small amount of alkoxy groups derived from the raw material thereof.

While not limited thereto, the content of such an adhesion promoter is preferably within a range of 0.01 to 10 parts by mass, or within a range of 0.01 to 5 parts by mass, with regard to 100 parts by mass of the total of components (A) to (C) because the curing properties and the discoloration of the cured product are not promoted.

Moreover, the present composition may contain a hydrosilylation reaction retarder in order to control the time to cure. Examples of the hydrosilylation reaction retarders include: alkyne alcohols such as 1-ethynyl cyclohexan-1-ol, 2-methyl-3-butyn-2-ol, 3,5-dimethyl-1-hexyn-3-ol and 2-phenyl-3-butyn-2-ol; en-yne compounds such as 3-methyl-3-penten-1-yne and 3,5-dimethyl-3-hexen-1-yne; methyl alkenyl siloxane oligomers such as 1,3,5,7-tetramethyl-1,3,5,7-tetravinyl cyclotetrasiloxane, 1,3,5,7-tetramethyl-1,3,5,7-tetrahexenyl cyclotetrasiloxane; alkynoxysilanes such as dimethyl bis(3-methyl-1-butyn-3-oxy)silane and methylvinyl bis(3-methyl-1-butyn-3-oxy)silane; alkynoxysilane compounds such as methyl tris(1-methyl-1-phenyl-propynoxy)silane, dimethyl bis(1-methyl-1-phenyl-propynoxy)silane, methyl tris(1,1-dimethyl-propynoxy)silane, dimethyl bis(1,1-dimethyl-propynoxy)silane; and benzotriazoles.

Because the content of this hydrosilylation reaction retarder is not limited and imparts sufficient pot life to the present composition, it is preferably within a range of 0.0001 to 5 parts by mass, within a range of 0.01 to 5 parts by mass, or within a range of 0.01 to 3 parts by mass, with respect to 100 parts by mass of the total of components (A) to (C).

Furthermore, as long as the object of the present invention is not impaired, if necessary, the present composition may contain conventionally known additives including: metal oxide fine powder such as fumed silica and wet silica; an alkenyl group-containing low molecular weight siloxane as a reactive diluent such as 1,1,3,3-tetramethyl-1,3-divinyldisiloxane, and 1,3,5,7-tetramethyl-1,3,5,7-tetravinylcyclotetrasiloxane; and a hindered phenol compound acting as conservation stability improvers such as 2,6-di-tert-butyl-4-methylphenol, 2,6-di-tert-butyl-4-hydroxymethylphenol, 2,6-bis(hydroxymethyl)-p-cresol, along with a heat-resistant improver such as N-nitrosophenylhydroxylamine aluminum salt.

While the viscosity at 25° C. of the present composition is not limited, it is preferably 100,000 mPa·s or less, within a range of 500 to 100,000 mPa·s, or within a range of 500 to 10,000 mPa·s. This is because, if the viscosity of the present composition is above the lower limit of the aforementioned range, the mechanical properties of the cured product obtained will be good; however, if, on the other hand, the viscosity is below the upper limit of the aforementioned range, the handleability of the composition obtained will be enhanced and air is less likely to be entrained in the cured product.

The present composition can be prepared by uniformly mixing components (A) to (D), and if necessary, any other components. When preparing the present composition, mixing can be performed at ordinary temperature using various types of stirrers or kneaders, and if necessary, mixing can be performed while heating. Furthermore, the order of combining the various components is not restricted, and mixing can be performed in any order.

Moreover, the present composition can be a one part composition in which all of the components are blended in the same container, or can be a two part composition which mixes during use in view of storage stability. When the two part composition is used, one composition is a mixture of components (A), (B), and (D), along with any other components, while the other composition is a mixture of components (A), (B), and (C), along with any other components.

The present composition can be cured at room temperature or at relatively low temperatures (for example, 40° C. or lower). Note that the curing reaction of the present composition can be adjusted to a desired speed in accordance with the concentration of the catalyst metal in component (D) and the type or content of the abovementioned hydrosilylation reaction retarder.

The present compositions are useful as various potting agents, sealants, and adhesives, and are particularly useful as optical pressure sensitive adhesives/adhesives for displays. At high temperatures or high temperatures and high humidity, the cured product thereof has little discoloration and tends not to cause clouding, making it suitable as a material that forms an intermediate layer between the image display part and the protective part of the display.

The present composition cures at relatively low temperatures and therefore can be suitably used for coating substrates with poor heat resistance. The type of substrate is generally a transparent substrate such as glass, along with synthetic resin films or sheets, and transparent electrode coatings. Furthermore, the application method of the present composition can be, for example, dispensing, gravure coating, microgravure coating, slit coating, slot die coating, screen printing, or comma coating.

Next, the cured product of the present invention will be described in detail. The cured product of the present invention is formed by curing the curable silicone composition described above. While the shape of the cured product is not limited, examples thereof include sheets, films, tapes, and lumps. Furthermore, integrating with various types of substrates is also possible.

The forming method of the cured product can be a method of applying the present composition to a film shaped substrate, tape shaped substrate, or sheet shaped substrate, then curing it by heating at room temperature or low temperature to form a cured film made of the cured product on the surface of the substrate. While the film thickness of the cured product is not limited, it is preferably 1 to 3000 μm, more preferably 50 to 1000 μm.

The laminate according to the present invention contains the abovementioned cured product and optical member. Examples of the optical members include inorganic optical materials such as glass and ITO, or organic optical materials such as polycarbonate resin, acrylic resin, epoxy resin, and polystyrene resin.

The optical display of the present invention is manufactured using the curable silicone composition of the present invention, with examples thereof including a light receiving display device such as an LCD (liquid crystal display), ECD (electrochromic display), along with a light emitting display device such as an ELD (electroluminescent display). In the optical display of the present invention, the visibility of the optical display can be enhanced by adhering or sticking between a display part such as a liquid crystal/organic EL and a display forming member such as a touch panel or cover lens or between display forming members via the cured product of the curable silicone composition of the present invention.

Typical methods for producing optical displays of the present invention may include, for example, a dam-fill method. Specifically, a dam material is dispensed to a width of than 1 mm or less in accordance with the shape of the display on a glass or an organic optical resin such as polycarbonate used as a cover lens, and cured by various methods. Subsequently, a method for producing an optical display is exemplified, wherein the curable silicone composition of the present invention is dispensed and the image display panel is bonded together, then heated at relatively low temperatures (for example, 40° C.) to cure the silicone composition.

Here, a UV curable, room temperature curable, or heat-curable liquid material having thixotropic properties can be used as the dam material. UV curable silicone materials can be preferably used in view of their high resistance to thermal shock (a so-called thermal cycle).

Moreover, in the optical display of the present invention, the present composition is rapidly cured at relatively low temperatures, specifically at temperatures of 40° C. or lower, therefore it tends not to cause deformation and deterioration of the thermally unstable material, along with clouding and discoloration of the cured product even if exposed to high temperatures and high humidity, and it enables the reliability of the optical display to improve.

EXAMPLES

The curable silicone composition, cured product thereof, and display device according to the present invention will be described in detail by way of examples. Note that in the formulae, Me, Vi, Ph, and Gly represent a methyl group, vinyl group, phenyl group, and 3-glycidoxypropyl group, respectively. Furthermore, in the examples, measurements and evaluations were carried out as described below.

[Viscosity of Organopolysiloxane and Curable Silicone Composition]

The viscosity (mPa·s) at 25° C. was measured using a rotary viscometer (E type viscometer VISCONIC EMD produced by TOKIMEC CORPORATION).

[Refractive Index of Organopolysiloxane and Cured Product]

Using a refractometer (RX-7000a produced by Atago Co., Ltd.; wavelength of light source: 589 nm), the refractive index at 25° C. was measured.

[Curing Properties of Curable Silicone Composition]

A test piece filled with a curable silicone composition was heated in an oven at 40° C. so that the dimensions of the cured silicone cured product were a length of 25 mm×width of 25 mm×thickness of 200 μm between the two glass plates (length of 75 mm×width of 25 mm×thickness of 2 mm). The test piece was removed every 15 minutes, the properties of the curable silicone composition were observed, and the curability thereof was evaluated by the time (minutes) until the composition lost fluidity.

[Transparency of Cured Product]

A curable silicone composition was filled and heated in an oven at 40° C. for one hour so that the dimensions of the cured silicone cured product were a length of 25 mm×width of 25 mm×thickness of 200 μm between the two glass plates (length of 75 mm×width of 25 mm×thickness of 2 mm), to cure the abovementioned composition so as to produce a test piece containing a cured product sandwiched between two glass plates. Regarding this test piece, the transmittance of the cured product was measured using a spectrophotometer (UV-3100PC produced by Shimadzu Corporation; wavelength: 450 nm).

[Cloudiness of Cured Product]

A curable silicone composition was filled and heated in an oven at 40° C. for one hour so that the dimensions of the cured silicone cured product were a length of 25 mm×width of 25 mm×thickness of 200 μm between the two glass plates (length of 75 mm×width of 25 mm×thickness of 2 mm), to cure the abovementioned composition so as to produce a test piece containing a cured product sandwiched between two glass plates. After this test sample was left to stand for 16 hours in a high temperature and high humidity environment of 85° C. and 85% RH, the clouding of the cured product was measured in accordance with the method stipulated in ASTM D1003.

[Mode of Adhesion of Cured Product]

A curable silicone composition was filled and heated in an oven at 40° C. for one hour so that the dimensions of the cured silicone cured product were a length of 25 mm×width of 25 mm×thickness of 200 μm between the two glass plates (length of 75 mm×width of 25 mm×thickness of 2 mm), to cure the abovementioned composition so as to produce a test piece containing a cured product sandwiched between two glass plates. This test piece was subjected to shear adhesion testing in accordance with the method stipulated in JIS K6850 to observe the mode of adhesion of the cured product.

Examples 1 to 5 and Comparative Examples 1 to 2

The curable silicone compositions were prepared at the compositions (parts by mass) shown in Table 1 using the following components. Note that the liquid curable silicone composition was prepared in portions of liquids A and B for mixing at a mass ratio of 1:1. That is, the following components (b-1), (b-3), (d-1), and (e-1) were blended in liquid A, the following components (c-1) and (c-2) were blended in liquid B, and liquids A and B were dispensed in components (a-1), (a-2), and (b-2). The thus prepared liquids A and B were mixed at a mass ratio of 1:1 using a static mixer to prepare a curable silicone composition. Note that in the table, the ratio of the SiH/alkenyl groups represents the value of the total number of moles of silicon atom bonded hydrogen atoms in components (c-1) to (c-2) to 1 mol of the total of vinyl groups in components (a-1) to (a-2) and methallyl groups in components (b-1) to (b-2) in the composition. Moreover, in the table, the proportion of EO represents the ratio of the number of moles of units represented by the formula: $C_2H_4O$ with respect to the total number of moles of units represented by the formula: $C_2H_4O$ and units represented by the formula: $CH_2CH(Me)O$ in components (b-1) to (b-3). Moreover, in the table, the EO content represents the proportion (mass %) of the total amount of units represented by formula: $C_2H_4O$ in components (b-1) to (b-3) with respect to the total amount of components (a-1) to (a-2), (b-1) to (b-3), (c-1) to (c-2), and (d-1).

The following components were used as component (A).
(a-1): a methylphenylpolysiloxane blocked with dimethylvinylsiloxy groups at both molecular chain terminals and having a viscosity of 3,000 mPa·s (content of phenyl groups: 45 mol %, refractive index: 1.53)
(a-2): a methylphenylpolysiloxane blocked with dimethylvinylsiloxy groups at both molecular chain terminals and having a viscosity of 40,000 mPa·s (content of phenyl groups: 48 mol %, refractive index: 1.54)
(a-3): a methylphenylpolysiloxane blocked with dimethylvinylsiloxy groups at both molecular chain terminals and having a viscosity of 2,800 mPa·s (content of phenyl groups: 43 mol %, refractive index: 1.53)

The following components were used as component (B).
(b-1): a polyoxyethylene blocked with dimetallyl groups at both molecular chain terminals and represented by the average unit formula:

$CH_2=C(Me)CH_2O(C_2H_4O)_{14}CH_2C(Me)=CH_2$ (b-2): a random copolymer of polyoxyethylene and polyoxypropylene blocked with dimetallyl groups at both molecular chain terminals and represented by the average unit formula:

$CH_2=C(Me)CH_2O(C_2H_4O)_{34}$
$[CH_2CH(Me)O]_{26}CH_2C(Me)=CH_2$ (b-3): a polyethylene glycol mono-4-octylphenyl ether represented by the average unit formula:

$HO(C_2H_4O)_{10}\text{-para-}C_6H_4—C_8H_{17}$ (b-4): a polyoxypropylene blocked with dimetallyl groups at both molecular chain terminals and represented by the average unit formula:

$CH_2=C(Me)CH_2O[CH_2CH(Me)O]_{21}$
$CH_2C(Me)=CH_2$

The following components were used as component (C).
(c-1): 1,1,5,5-tetramethyl-3,3-diphenyl trisiloxane
(c-2): an organopolysiloxane represented by the average unit formula:

$(Me_2HSiO_{1/2})_{0.6}(PhSiO_{3/2})_{0.4}$ having a viscosity of 20 mPa·s

The following component was used as component (D).
(d-1): a phenyltrisdimethylvinylsiloxysilane solution of a platinum (0)-1,3-divinyl-1,1,3,3-tetramethyldisiloxane complex having a platinum content of 0.49% by mass.

The following component was used as component (E).
(e-1): a mixture of methylphenyl cyclosiloxane represented by the formula:

[Formula 3]

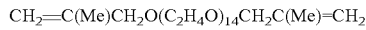

(wherein, x is an integer of 3 to 10)
having a viscosity of 50 mPa·s

The following components were used as an adhesion imparting agent.
(f-1): an organopolysiloxane represented by the average unit formula:

$(Me_2ViSiO_{1/2})_{0.18}(GlyMeSiO_{2/2})_{0.29}(PhSiO_{3/2})_{0.53}$ and represented by the average composition formula:

$Gly_{0.29}Me_{0.65}Vi_{0.8}Ph_{0.53}SiO_{1.18}$ having a viscosity of 18,000 mPas (f-2): a silicon-containing compound represented by formula:

$(MeO)_3SiC_6H_{12}Si(OMe)_3$

TABLE 1

|  |  | Present invention | | | | | Comparative Example | |
|---|---|---|---|---|---|---|---|---|
|  |  | Example 1 | Example 2 | Example 3 | Example 4 | Example 5 | Comparative Example 1 | Comparative Example 2 |
| Curable silicone | (a-1) | 43.9 | 42.5 | 41.3 | — | — | 45.8 | 45.1 |
| composition | (a-2) | 43.9 | 42.5 | 41.3 | 67.3 | 62.6 | 45.8 | 45.1 |
| (parts by mass) | (b-1) | 3.0 | 5.0 | 7.0 | 1.0 | 5.0 | — | — |
|  | (b-2) | — | — | — | 25.1 | 25.1 | — | — |
|  | (b-3) | — | — | — | — | — | — | 3.0 |
|  | (c-1) | 6.1 | 6.7 | 7.1 | 2.2 | 2.6 | 5.3 | 1.9 |
|  | (c-2) | 1.0 | 1.1 | 1.1 | 2.0 | 2.3 | 0.9 | 2.6 |
|  | (d-1) | 0.2 | 0.2 | 0.2 | 0.3 | 0.3 | 0.2 | 0.2 |
|  | (f-1) | 2.0 | 2.0 | 2.0 | 2.0 | 2.0 | 2.0 | 2.0 |
|  | (f-2) | — | — | — | — | — | — | — |
| SiH/alkenyl group |  | 1.1 | 1.1 | 1.0 | 0.8 | 0.7 | 1.1 | 0.9 |
| Proportion of EO |  | 1.00 | 1.00 | 1.00 | 0.58 | 0.64 | — | 1.00 |
| EO content (mass %) |  | 2.5 | 4.2 | 5.9 | 13.1 | 16.5 | — | 2.1 |
| Viscosity (mPa · s) |  | 3720 | 2830 | 2290 | 3880 | 2720 | 6060 | 6830 |
| Curability (minutes) |  | 15 | 30 | 30 | 15 | 30 | 15 | 30 |
| Transparency (%) |  | >99 | >99 | >99 | >99 | >99 | >99 | >99 |
| Refractive index |  | 1.546 | 1.544 | 1.543 | 1.524 | 1.521 | 1.549 | 1.548 |
| Cloudiness |  | 0.5 | 0.0 | 0.0 | 0.0 | 0.0 | 10.0 | 6.0 |
| Mode of adhesion |  | — | Cohesive failure | Cohesive failure | Cohesive failure | Cohesive failure | Interfacial peeling | — |

It was confirmed from the results of Examples 1 to 5 that in the curable silicone composition of the present invention, the initial transparency of the cured product was high and tended not to cause clouding even after being exposed to high temperatures and high humidity. It was confirmed from the results of Comparative Example 1 that in the curable silicone composition free from component (B), the initial transparency of the cured product was high, but significantly caused clouding if exposed to high temperatures and high humidity.

Example 6

2.5 g of the curable silicone composition prepared in Example 2 was placed on a float glass having a thickness of 2 mm and lengths of the long side and short side of 165 mm and 105 mm, respectively, the gap was adjusted to 130 microns, a polycarbonate panel as a cover lens (thickness of 1 mm; lengths of the long side and short side of 210 mm and 160 mm; MRS-58T produced by Mitsubishi Gas Chemical, Inc.) was placed, and lamination under reduced pressure was carried out to obtain a laminate panel of glass-curable silicone composition-polycarbonate. The obtained laminate panel was placed in an oven set at 40° C. and heated for one hour to obtain a laminate panel containing a glass-silicone cured product-polycarbonate.

The obtained laminate panel was aged for 24 hours at 90° C., with neither crack generation nor panel peeling observed.

Similarly, the obtained laminate panel was subjected to durability testing in a thermal shock tester at −40° C./85° C. (retention time of 2 hours at −40° C. and 85° C.), with neither crack generation nor panel peeling observed after 40 cycles of the testing.

Examples 7 to 11 and Comparative Example 3

The curable silicone compositions were prepared at the compositions (parts by mass) shown in Table 2 using the abovementioned components. Note that the liquid curable silicone composition was prepared in portions of liquids A and B for mixing at a mass ratio of 1:1. That is, the following components (b-1), (d-1), and (e-1) were blended in liquid A, the following components (c-1) and (c-2) were blended in liquid B, and liquids A and B were dispensed in components (a-1), (a-2), and (b-2). The thus prepared liquids A and B were mixed at a mass ratio of 1:1 using a static mixer to prepare a curable silicone composition. Note that in the table, the ratio of the SiH/alkenyl groups represents the value of the total number of moles of silicon atom bonded hydrogen atoms in components (c-1) to (c-2) to 1 mol of the total of vinyl groups in components (a-1) to (a-3) and methallyl groups in components (b-1) to (b-2) in the composition. Moreover, in the table, the proportion of EO represents the ratio of the number of moles of units represented by the formula: $C_2H_4O$ with respect to the total number of moles of units represented by the formula: $C_2H_4O$ and units represented by the formula: $CH_2CH(Me)O$ in components (b-1) to (b-2). Moreover, in the table, the EO content represents the proportion (mass %) of the total amount of units represented by formula: $C_2H_4O$ in components (b-1) to (b-2) with respect to the total amount of components (a-1) to (a-3), (b-1) to (b-2), (c-1) to (c-2), and (d-1).

TABLE 2

|  |  | Present invention | | | | | Comparative Example |
|---|---|---|---|---|---|---|---|
|  |  | Example 7 | Example 8 | Example 9 | Example 10 | Example 11 | Comparative Example 3 |
| Curable silicone composition (parts by mass) | (a-1) | 47.5 | — | — | — | 49.8 | 47.2 |
|  | (a-2) | 28.2 | 41.7 | 34.7 | 27.5 | 29.6 | 28.0 |
|  | (a-3) | — | 35.2 | 29.3 | 46.4 | — | — |
|  | (b-1) | — | 5.0 | 5.0 | 5.0 | — | — |
|  | (b-2) | 5.0 | — | — | — | 1.0 | — |
|  | (b-4) | — | — | — | — | — | 5.0 |
|  | (c-1) | 7.1 | 7.8 | 6.9 | 8.9 | 7.1 | 7.8 |
|  | (c-2) | 0.5 | 1.0 | 1.0 | 0.8 | 0.4 | 0.4 |
|  | (d-1) | 0.2 | 0.3 | 0.3 | 0.3 | 0.2 | 0.2 |
|  | (e-1) | 1.0 | 6.6 | 20.5 | 8.6 | 9.4 | 8.9 |
|  | (f-1) | 2.0 | 2.0 | 2.0 | 2.0 | 2.0 | 2.0 |
|  | (f-2) | 0.5 | 0.5 | 0.5 | 0.5 | 0.5 | 0.5 |
| SiH/alkenyl group |  | 1.0 | 1.0 | 1.0 | 1.0 | 1.0 | 1.0 |
| Proportion of EO |  | 0.57 | 1.00 | 1.00 | 1.00 | 0.57 | 0 |
| EO content (mass %) |  | 2.4 | 4.1 | 4.1 | 4.1 | 0.5 | 0 |
| Viscosity (mPa · s) |  | 1580 | 1780 | 1280 | 1010 | 1800 | 1340 |
| Curability (minutes) |  | 15 | 30 | 30 | 30 | 15 | 15 |
| Transparency (%) |  | >99 | >99 | >99 | >99 | >99 | >99 |
| Refractive index |  | 1.541 | 1.543 | 1.542 | 1.543 | 1.545 | 1.541 |
| Cloudiness |  | 0.4 | 0.1 | 0.3 | 0.0 | 1.0 | 15.0 |
| Mode of adhesion |  | Cohesive failure | Cohesive failure | Cohesive failure | Cohesive failure | Cohesive failure | Cohesive failure |

It was confirmed from the results of Examples 7 to 11 that in the curable silicone composition of the present invention, the viscosity was low, the initial transparency of the cured product was high, and it tended not to cause clouding even after being exposed to high temperatures and high humidity.

Example 12

2.5 g of the curable silicone composition prepared in Example 10 was placed on a float glass having a thickness of 2 mm and lengths of the long side and short side of 165 mm and 105 mm, respectively, the gap was adjusted to 130 microns, a polycarbonate panel as a cover lens (thickness of 1 mm; lengths of the long side and short side of 210 mm and 160 mm; MRS-58T produced by Mitsubishi Gas Chemical, Inc.) was placed, and lamination under reduced pressure was carried out to obtain a laminate panel of glass-curable silicone composition-polycarbonate. The obtained laminate panel was placed in an oven set at 40° C. and heated for one hour to obtain a laminate panel containing a glass-silicone cured product-polycarbonate.

The obtained laminate panel was aged for 24 hours at 90° C., with neither crack generation nor panel peeling observed.

Similarly, the obtained laminate panel was subjected to durability testing in a thermal shock tester at −40° C./85° C. (retention time of 2 hours at −40° C. and 85° C.), with neither crack generation nor panel peeling observed.

INDUSTRIAL APPLICABILITY

Because the curable silicone composition of the present invention rapidly cures at relatively low temperatures and forms a cured product which maintains transparency and tends not to cause clouding and discoloration even if exposed to high temperatures and high humidity, the curable silicone composition is useful as an adhesive or pressure sensitive adhesive for optical displays.

The invention claimed is:

1. A curable silicone composition comprising:
(A) an organopolysiloxane having at least two alkenyl groups with 2 to 12 carbon atoms and at least one aryl group with 6 to 20 carbon atoms in each molecule;
(B) a polyoxyalkylene compound represented by the general formula:

$$XO\text{---}(C_2H_4O)_p(C_nH_{2n}O)_q(YO)_r\text{---}X$$

wherein, each X represents the same or different hydrogen atom, alkyl group with 1 to 12 carbon atoms, alkenyl group with 1 to 12 carbon atoms, aryl group with 6 to 20 carbon atoms, acryl group, or methacryl group, provided that at least one X in each molecule is the alkenyl group, the acryl group, or the methacryl group, Y represents a divalent hydrocarbon group with 2 to 20 carbon atoms, n represents an integer of 3 to 6, p and q are integers satisfying: $2 \leq p \leq 100$ and $0 \leq q \leq 50$, and r represents 0 or 1;
(C) an organopolysiloxane having at least two silicon bonded hydrogen atoms in each molecule;
(D) a catalyst for a hydrosilylation reaction; and
(E) a diorganosiloxane oligomer having at least one aryl group with 6 to 20 carbon atoms and not having a hydrosilylation reactive functional group in each molecule, in an amount of 1 to 50 parts by mass with respect to 100 parts by mass of the total of components (A) to (D);

wherein the content of component (B) is an amount such that the total amount of units represented by the formula: $C_2H_4O$ in component (B) is 0.4 to 40 mass % with respect to the total amount of components (A) to (D);

wherein the content of component (C) is an amount such that the silicon bonded hydrogen atoms in component (C) are 0.1 to 5 mol per 1 mol of the total aliphatic unsaturated carbon-carbon bonds in components (A) and (B);

wherein the content of component (D) is a sufficient amount to promote curing of the composition; and wherein component (E) is a diorganosiloxane oligomer represented by the general formula:

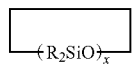

where each R is the same or different monovalent hydrocarbon group with 1 to 12 carbon atoms not having an aliphatic unsaturated bond, provided that at least one R in each molecule is an aryl group with 6 to 20 carbon atoms, while x is an integer of 3 to 10.

2. The curable silicone composition according to claim 1, wherein the viscosity at 25° C. of component (A) is 50 to 100,000 mPa·s.

3. The curable liquid silicone composition according to claim 1, wherein the content of aryl groups with respect to all silicon atom bonded organic groups in component (A) is at least 30 mol %.

4. The curable silicone composition according to claim 1, wherein the viscosity at 25° C. of component (C) is 1 to 10,000 mPa·s.

5. The curable silicone composition according to claim 1, wherein the viscosity at 25° C. of component (E) is 1 to 500 mPa·s.

6. The curable silicone composition according to claim 1, wherein component (E) is a diorganosiloxane oligomer having an aryl group of 5 to 60 mol % of all Rs in each molecule.

7. The curable silicone composition according to claim 1, which is an optical adhesive or pressure sensitive adhesive.

8. A cured product obtained by curing the curable silicone composition according to claim 1.

9. A laminate comprising:
the cured product according to claim 8; and
an optical member.

10. An optical display obtained using the curable silicone composition according to claim 1.

11. A laminate comprising:
a cured product; and
an optical member;
wherein the cured product is obtained by curing a curable silicone composition; and
wherein the curable silicone composition comprises:
(A) an organopolysiloxane having at least two alkenyl groups with 2 to 12 carbon atoms and at least one aryl group with 6 to 20 carbon atoms in each molecule;
(B) a polyoxyalkylene compound represented by the general formula:

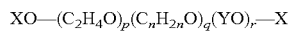

wherein, each X represents the same or different hydrogen atom, alkyl group with 1 to 12 carbon atoms, alkenyl group with 1 to 12 carbon atoms, aryl group with 6 to 20 carbon atoms, acryl group, or methacryl group, provided that at least one X in each molecule is the alkenyl group, the acryl group, or the methacryl group, Y represents a divalent hydrocarbon group with 2 to 20 carbon atoms, n represents an integer of 3 to 6, p and q are integers satisfying: $2 \leq p \leq 100$ and $0 \leq q \leq 50$, and r represents 0 or 1;

(C) an organopolysiloxane having at least two silicon bonded hydrogen atoms in each molecule; and (D) a catalyst for a hydrosilylation reaction;

wherein the content of component (B) is an amount such that the total amount of units represented by the formula: $C_2H_4O$ in component (B) is 0.4 to 40 mass % with respect to the total amount of components (A) to (D);

wherein the content of component (C) is an amount such that the silicon bonded hydrogen atoms in component (C) are 0.1 to 5 mol per 1 mol of the total aliphatic unsaturated carbon-carbon bonds in components (A) and (B); and wherein the content of component (D) is a sufficient amount to promote curing of the composition.

12. An optical display obtained using a curable silicone composition, wherein the curable silicone composition comprises:

(A) an organopolysiloxane having at least two alkenyl groups with 2 to 12 carbon atoms and at least one aryl group with 6 to 20 carbon atoms in each molecule;

(B) a polyoxyalkylene compound represented by the general formula:

wherein, each X represents the same or different hydrogen atom, alkyl group with 1 to 12 carbon atoms, alkenyl group with 1 to 12 carbon atoms, aryl group with 6 to 20 carbon atoms, acryl group, or methacryl group, provided that at least one X in each molecule is the alkenyl group, the acryl group, or the methacryl group, Y represents a divalent hydrocarbon group with 2 to 20 carbon atoms, n represents an integer of 3 to 6, p and q are integers satisfying: $2 \leq p \leq 100$ and $0 \leq q \leq 50$, and r represents 0 or 1;

(C) an organopolysiloxane having at least two silicon bonded hydrogen atoms in each molecule; and (D) a catalyst for a hydrosilylation reaction;

wherein the content of component (B) is an amount such that the total amount of units represented by the formula: $C_2H_4O$ in component (B) is 0.4 to 40 mass % with respect to the total amount of components (A) to (D);

wherein the content of component (C) is an amount such that the silicon bonded hydrogen atoms in component (C) are 0.1 to 5 mol per 1 mol of the total aliphatic unsaturated carbon-carbon bonds in components (A) and (B); and wherein the content of component (D) is a sufficient amount to promote curing of the composition.

* * * * *